United States Patent

Wai

(10) Patent No.: US 10,318,984 B1
(45) Date of Patent: Jun. 11, 2019

(54) PREDICTIVE RECOMMENDATION SYSTEM USING TIERED FEATURE DATA

(71) Applicant: Groupon, Inc., Chicago, IL (US)

(72) Inventor: Lawrence Lee Wai, Mountain View, CA (US)

(73) Assignee: GROUPON, INC., Chicago, IL (US)

(*) Notice: Subject to any disclaimer, the term of this patent is extended or adjusted under 35 U.S.C. 154(b) by 849 days.

(21) Appl. No.: 14/814,154

(22) Filed: Jul. 30, 2015

Related U.S. Application Data

(60) Provisional application No. 62/031,071, filed on Jul. 30, 2014.

(51) Int. Cl.
*G06Q 30/02* (2012.01)
*G06N 20/00* (2019.01)

(52) U.S. Cl.
CPC ........ *G06Q 30/0244* (2013.01); *G06N 20/00* (2019.01); *G06Q 30/0255* (2013.01); *G06Q 30/0269* (2013.01)

(58) Field of Classification Search
CPC .................................................. G06Q 30/02
See application file for complete search history.

(56) References Cited

U.S. PATENT DOCUMENTS

| 2002/0069105 A1* | 6/2002 | do Rosario Botelho ................... G06F 17/30867 705/14.53 |
| 2008/0254896 A1* | 10/2008 | Sispoidis ............... G06Q 30/02 463/43 |
| 2010/0100414 A1* | 4/2010 | Lin ........................ G06Q 30/02 705/14.43 |

OTHER PUBLICATIONS

U.S. Appl. No. 14/231,222, filed Mar. 31, 2014.
U.S. Appl. No. 13/929,977, filed Jun. 28, 2013.
U.S. Appl. No. 13/839,360, filed Mar. 15, 2013.
U.S. Appl. No. 13/411,502, filed Mar. 2, 2012.

* cited by examiner

*Primary Examiner* — Vincent M Cao
(74) *Attorney, Agent, or Firm* — Alston & Bird LLP

(57) ABSTRACT

In general, embodiments of the present invention provide systems, methods and computer readable media for a predictive recommendation system using predictive models derived from tiered feature data.

17 Claims, 6 Drawing Sheets

PREDICTIVE RECOMMENDATION SYSTEM USING TIERED FEATURE DATA

CROSS-REFERENCE TO RELATED APPLICATIONS

This application claims the benefit of U.S. Provisional Application No. 62/031,071, entitled "PREDICTIVE RECOMMENDATION SYSTEM USING TIERED FEATURE DATA," and filed Jul. 30, 2014, the entire contents of which are hereby incorporated by reference.

FIELD

Embodiments of the invention relate, generally, to a predictive recommendation system using predictive models derived from tiered feature data.

BACKGROUND

Current methods for recommending promotions to consumers for purchase exhibit a plurality of problems that make current systems insufficient, ineffective and/or the like. Through applied effort, ingenuity, and innovation, solutions to improve such methods have been realized and are described in connection with embodiments of the present invention.

SUMMARY

The capability to recommend promotions for purchase that are most relevant to each consumer is important for a promotion and marketing service, because maintaining an active and engaged customer base means maximizing profits. In some embodiments, a relevance system is used to select promotions to be recommended to a consumer (i.e., the available promotions that are most relevant to the consumer) based on using stored data representing attributes of promotions and/or the consumer, and is performed by executing a workflow that specifies a sequence of filtering rules and/or algorithms to be applied in selecting the relevant promotions.

In some examples, the digitalization of promotion and marketing has introduced specific problems not present in prior art promotion or marketing services found in print or broadcast media. In particular, advertisement space or time was generally constrained by the size of the print media or the length of the broadcast media. No such constraints are present in digital or online promotion and marketing. As such, a promotion and marketing service may have thousands or millions of different promotions, with only a subset of the promotions being currently viewable to the user.

As such, and according to some example embodiments, the systems and methods described herein are therefore configured to rank promotions selected for recommendation to consumers based on predictions of promotion performance and consumer behavior. The top-ranked promotions may be featured in a presentation to the consumer.

In some embodiments, each of a set of available promotions to be recommended to a particular consumer can be sorted and/or ranked according to a probability that the consumer's behavior in response to the promotion will match a ranking target (e.g., conversion rate, gross revenue). In some embodiments, promotions available to a consumer are ranked based on a relevance model derived from one or more data sources representing attributes of promotions and consumer behavior. Using the model, each promotion is associated with a relevance score that represents the probability that the consumer's behavior with respect to the promotion will approach the ranking target while the consumer interacts with an impression containing content describing the promotion. In some embodiments, the set of promotions selected for recommendation to a consumer can be sorted and/or ranked based on their respective associated relevance scores.

In embodiments, the relevance model may be a predictive function. In some embodiments, the predictive function may be a trainable function that is developed using machine learning. In some embodiments, the predictive function may be generated offline using supervised learning in a set of modeling stages in which the function is adapted based on training data sets of features that are extracted from a set of data sources (e.g., log data, promotion and user attribute data). In some embodiments, the set of data sources includes contextual data sources. In embodiments, examples of contextual data sources for mobile consumers may include user locations (prior, current, or potential) and their associated categories of interest; prior promotion interest level shown by the consumer; and prior promotion subcategory interest level.

In some embodiments, a feature set is aggregated to produce feature vectors to be used as input for predictive functions. In embodiments, a feature vector may include one or more combined features that each are derived from integrating historical behavior data collected from a sample of consumers and recently collected behavior data (Dynamic Deal Optimization (DDO) data). In some embodiments, a combined promotion performance feature value is a score that is calculated using a single data source in which historical performance data and DDO performance data have been integrated. This feature extraction method increases both efficiency and accuracy over alternative methods of calculating the combined performance score by combining separately calculated historical and DDO scores. In embodiments, DDO data may be aggregated at increasing levels of granularity (i.e., tiered) to ensure that creating an integrated data source representing a particular promotion does not have to depend on data collected at the promotion permalink level.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
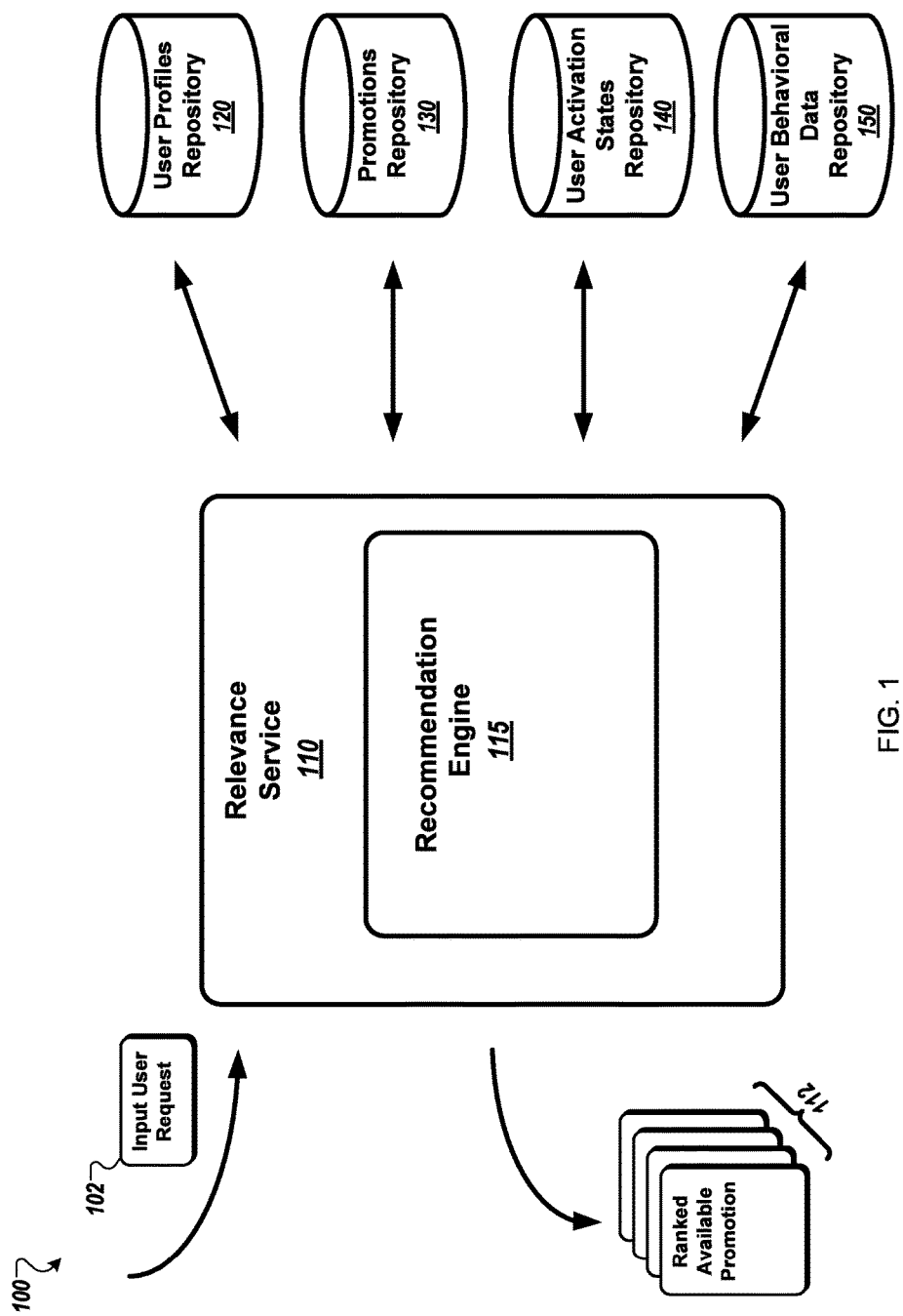
FIG. 1 illustrates an example system that can be configured to implement the relevance ranking of promotions that are available from a promotion and marketing service and are to be recommended to a particular consumer in accordance with some embodiments discussed herein.

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the terms "promotion," "offer," "deal" and similar terms may be used interchangeably to refer, without limitation, to any type of offered, presented or otherwise indicated reward, discount, coupon, credit, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

As used herein, the term "instrument" may be used, without limitation, to refer to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

As used herein, the terms "consumer" and "customer" may be used interchangeably to refer, without limitation, to a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

FIG. 1 illustrates an example system 100 that can be configured to implement the relevance ranking of promotions that are available from a promotion and marketing service and are to be recommended to a particular consumer (i.e., "user"). System 100 comprises a relevance service 110 that returns a set of available promotions 112 that are ranked for relevance to a consumer in response to receiving a request 102 for available promotions on behalf of the consumer; a user profiles repository 120 in which data representing profile attributes of consumers are stored; a promotions repository 130 in which data representing attributes of promotions are stored; a user activation states repository 140 in which data representing consumer activation states respectively associated with consumers are stored; and a user behavioral data repository 150 in which historical data representing the respective consumer behavior of consumers are stored. The relevance service 110 includes a recommendation engine 115 that is configured to select available promotions to be recommended to a particular consumer.

In some embodiments, recommendation engine 115 generates a set of available promotions that are most relevant to a consumer in response to receiving consumer identification data representing the consumer. In some embodiments, generating the set of available promotions includes selecting the promotions using stored data representing attributes of promotions and/or the consumer, and is performed by executing a workflow that specifies a sequence of filtering rules and/or algorithms to be applied in selecting the relevant promotions. A workflow may include ranking the selected promotions for relevance to the consumer and then ordering the selected promotions based on their respective rankings. In some embodiments, the most highly ranked promotions may be presented to the consumer as featured recommended promotions.

Figure 2:
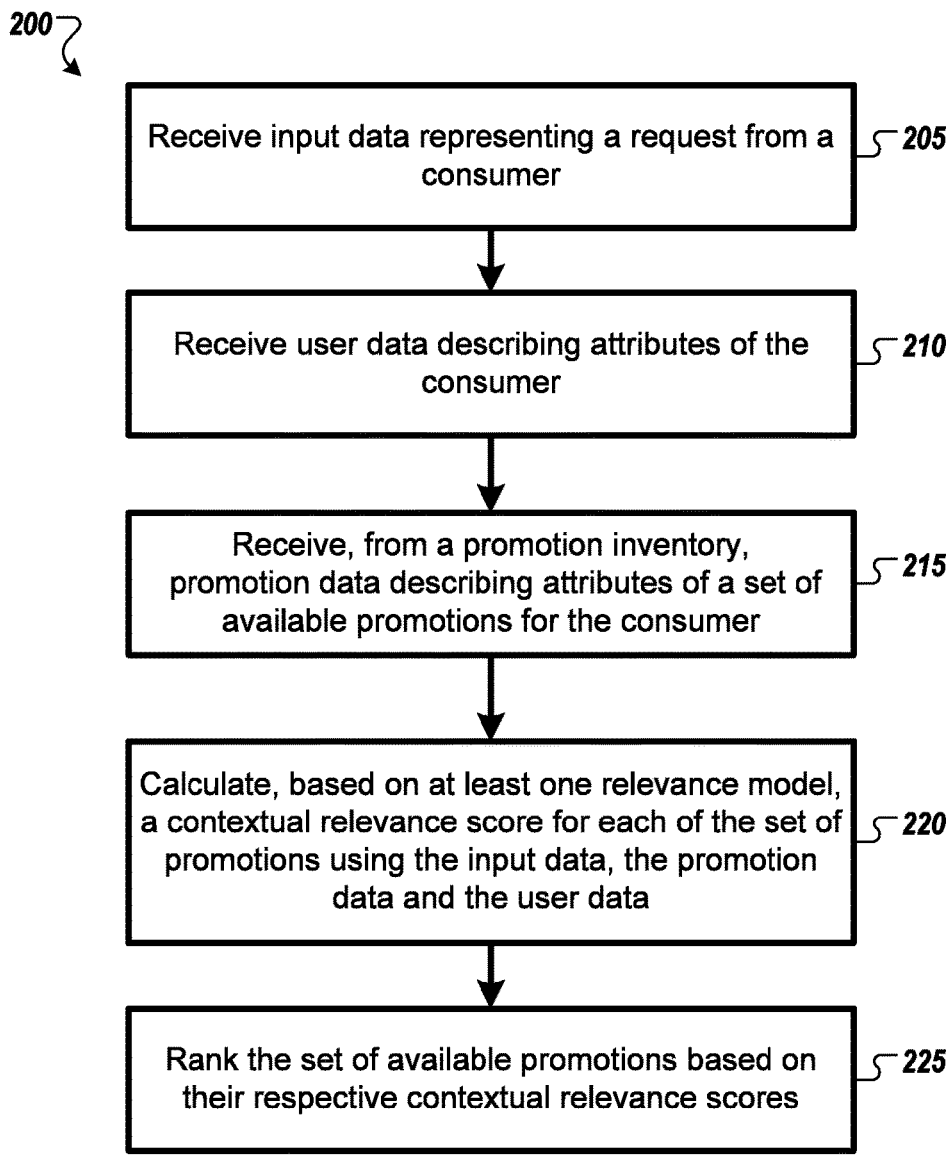
FIG. 2 is a flow diagram of an example method for generating and ranking a set of promotions to be recommended to a consumer in accordance with some embodiments discussed herein.

FIG. 2 is a flow diagram of an example method 200 for generating and ranking a set of promotions to be recommended to a consumer. Systems and methods for generating and ranking a set of promotions to be recommended to a consumer are described, for example, in U.S. patent application Ser. No. 14/231,222 entitled "Predictive Recommendation System Using Contextual Relevance," filed on Mar. 31, 2014, and which is incorporated herein in its entirety. For convenience, the method 200 will be described with respect to a system, including one or more computing devices, that performs the method 200. Specifically, the method 200 will be described with respect to its implementation by recommendation engine 115 in system 100.

In embodiments, the system receives 205 input data representing a request from a consumer. The input data can include consumer identification data. In some embodiments, for example, the consumer identification data may include a unique consumer identifier (e.g., a login identifier that is provided by a consumer when the consumer interacts with the content) and/or at least one consumer-associated bcookie, which is a unique identifier of a device (e.g., a mobile phone, a tablet, or a personal computer) and/or a mobile application or browser from which the consumer accesses the content. Identifying a consumer through associated bcookies ensures that a wider variety of behavioral data may be collected from the consumer since not all types of consumer access to content require the consumer to first provide a unique identifier.

In embodiments, the system receives 210 user data describing attributes of the consumer. In some embodiments, the user data may include historical data representing the consumer's previous consumer behavior. In some embodiments, the behavioral data that is collected from a particular consumer can be associated with that consumer's identification data so that a collection of multiple instances of behavior from a single consumer may be stored as history data in a consumer behavioral data repository 150. Examples of collected consumer behavioral data include instances of consumer engagement with published content (e.g., instances in which a consumer opens a mobile application, clicks on and/or opens an email, or visits a website), and consumer activation state (e.g., instances in which a consumer makes a promotion purchase).

In embodiments, the system receives 210 promotion data describing attributes of a set of promotions that currently are available to the consumer. In some embodiments, the set of available promotions are selected in response to a search query that is executed against promotions data, stored in a promotions repository 130, describing attributes of promotions in a promotions inventory. In some embodiments, the promotions repository 150 may be a implemented within a parallel distributed search platform (e.g., open-source "Elasticsearch," see http://www.elasticsearch.org/), and returning results from the search query may be implemented by sharding data including a set of promotion attributes as well as consumer attributes described in the received input data and/or the received user data. Additionally and/or alternatively, in some embodiments, the set of promotions may be selected by executing a sequence of filtering rules and/or algorithms that are applied to one or a combination of the promotions data, the input data, and/or the user data.

In embodiments, the system calculates 220 a contextual relevance score for each of the set of available promotions. In some embodiments, the system calculates the contextual relevance score for each available promotion using one or a combination of the input data, the promotion data, and the user data and based on at least one relevance model derived from a set of contextual data sources. In embodiments, the contextual relevance score represents a predicted probability that the consumer will purchase the promotion if the promotion is included in the content of an impression distributed to the consumer.

In embodiments, the system ranks 225 the set of available promotions based on their respective contextual relevance scores using a relevance model. In some embodiments, each of a set of available promotions to be recommended to a particular consumer can be ranked, based on data representing the promotion's performance and the consumer's behavior, according to a probability that the consumer's behavior in response to the promotion will match a ranking target.

In some embodiments, each promotion is represented by a feature vector that includes feature data representing attributes of the promotion and attributes of the consumer. In some embodiments, the feature data elements of the feature vector are selected based on the ranking target. There is a variety of well-known types of predictive functions (e.g., clustering algorithms, classifiers, neural networks, ensemble of trees), and the implementation choice of predictive function is not critical to the invention.

Figure 3:
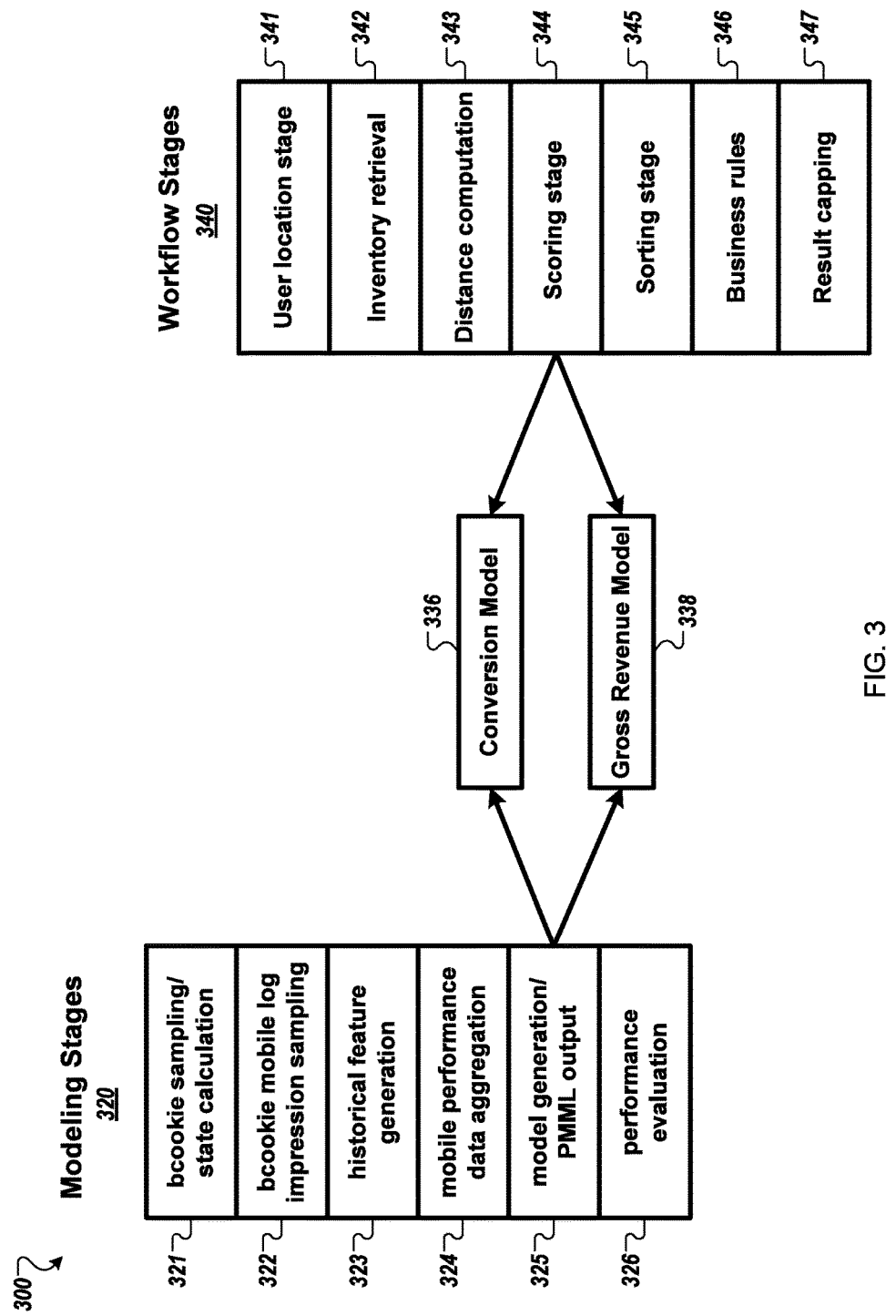
FIG. 3 is a diagram of an exemplary overview process for generating a relevance model derived from contextual data sources and, based on the model, calculating a contextual relevance score for each of a set of available promotions to a mobile consumer during a workflow in accordance with some embodiments discussed herein.

FIG. 3 is a diagram of an exemplary overview process 300 for generating a relevance model derived from contextual data sources and, based on the model, calculating a contextual relevance score for each of a set of available promotions to a mobile consumer during a workflow. Contextual mobile relevance generally refers to mobile relevance based on the context (e.g., the where/when/how/who/why) within which a request for promotions on behalf of a consumer occurs. In embodiments, examples of contextual data sources for mobile consumers may include user locations (prior, current, or potential) and their associated categories of interest; prior promotion interest level shown by the consumer; and prior promotion subcategory interest level.

In some embodiments, the relevance model can be generated offline using supervised learning. In a typical supervised learning scenario, a predictive function that maps an input value to one of a set of predefined output values is adapted, in response to exposure to a training data set containing examples of inputs and their respective associated outputs, to perform a mapping that represents a particular predictive model. In some embodiments, the predictive function maps data representing the promotion's performance and the consumer's behavior to one of a set of probability classes, each class representing a different probability that the data matches a ranking target.

In some embodiments, the predictive function may be generated offline using machine learning in a set of modeling stages 320 in which the function is adapted (e.g., in stage 325) based on a set of features that are extracted (e.g., in stages 321, 322, and 323) from a set of data sources (e.g., log data, promotion and user attribute data). In some embodiments, the set of data sources includes contextual data sources.

Figure 4:
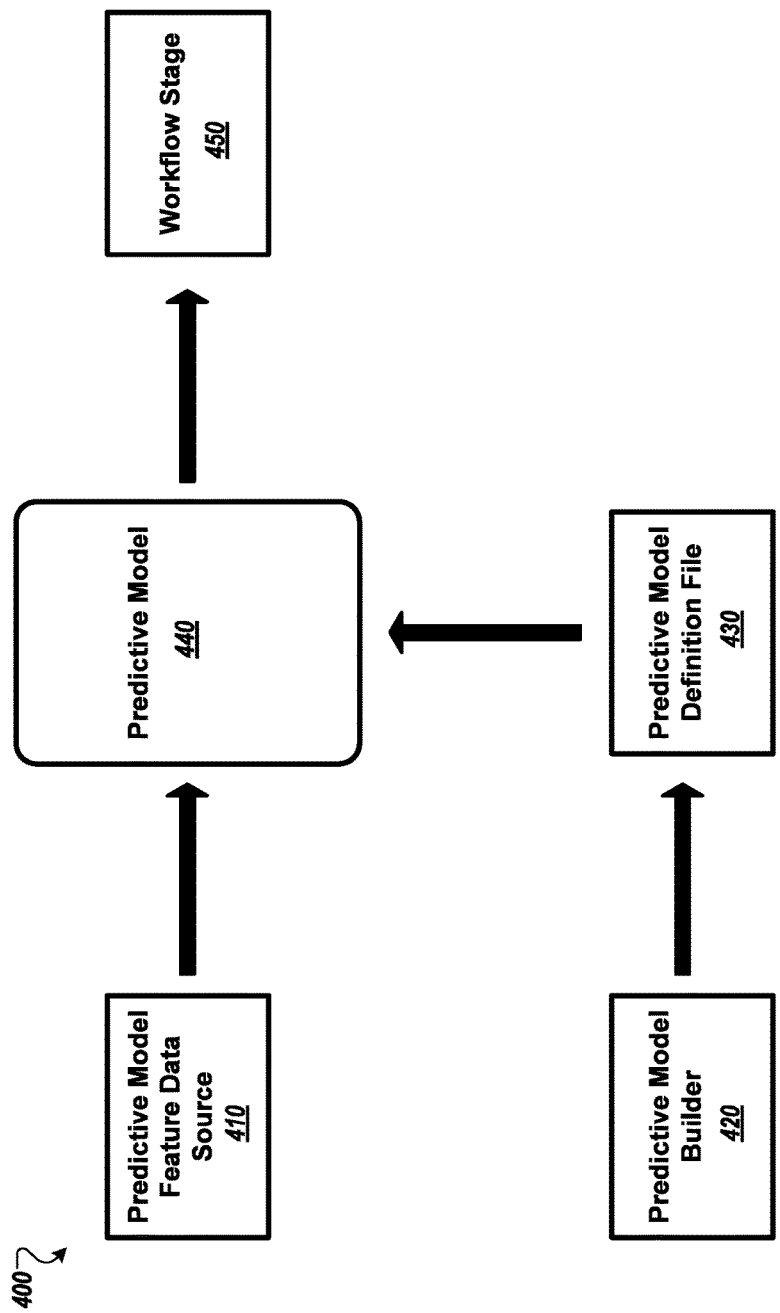
FIG. 4 is an illustration of an exemplary process 400 for generating a predictive relevance model that will be used in a workflow calculating a contextual relevance score in accordance with some embodiments discussed herein.

FIG. 4 is an illustration of an exemplary process 400 for generating a predictive relevance model that will be used in a workflow calculating a contextual relevance score. Specifically, process 400 may be implemented in the modeling stages 320 and used in one or more of the workflow stages 340 of process 300.

In embodiments, the predictive model feature data source 410 includes methods for extracting feature data values from a set of data sources received during a set of data collection stages (e.g., stages 321, 322, and 323 in FIG. 3). In embodiments in which the predictive model represents a mobile consumer, the features can include attributes of the consumer (e.g., bcookie engagement/activation state, distance from cookie to promotion); attributes of the promotion (e.g., promotion category, promotion price); and consumer behavior of a particular consumer (e.g., # impressions of the promotion for the bcookie) and/or historical behavior data collected from a sample of consumers (e.g., clicks per impression of the promotion (all bcookies).

In some embodiments, a feature set is aggregated (e.g., stage 324) to produce feature vectors to be used as input for predictive functions. Each of the feature vectors has reduced dimensionality and optimally represents the model of the ranking target associated with the predictive function. For example, in some embodiments in which the type of predictive function is an ensemble of trees, a random forest algorithm is used to produce 10 tree ensembles with a maximum of 20 nodes per tree. The random forest algorithm generates a ranking target model as output, as well as calculates the relative importance of each of the features used in the model. Extracting feature data values is described, for example, in U.S. patent application Ser. No. 13/929,977 entitled "Predictive Recommendation System," filed on Jun. 28, 2013, and which is incorporated herein in its entirety.

The generated predictive model (e.g., models 336 and 338 in FIG. 3) is represented by a predictive model definition file 430, which is generated by a predictive model builder 420. In embodiments, the predictive model 440, including the predictive model definition file 430 and predictive model feature data source 410, may be accessed by recommendation engine 115 for data feature extraction and calculation of a contextual relevance score during a runtime workflow stage 450 (e.g., scoring stage 344 in FIG. 3).

In embodiments, a feature vector may include one or more combined features that each are derived from integrating historical behavior data collected from a sample of consumers and recently collected behavior data (Dynamic Deal Optimization data; DDO data hereinafter) (e.g., a data sample that trails over the past 90 days). A model, such as a model relating to DDO, is further described with reference to U.S. patent application Ser. No. 13/839,360 entitled "Dynamic Promotion Analytics," filed on Mar. 15, 2013, and which is incorporated herein in its entirety.

As previously described with reference to modeling stages 320, a predictive model (e.g., conversion model 336) is an odds model derived using a set of features that are extracted (e.g., in stages 321, 322, and 323) from a set of data sources. For example, a historical consumer behavior feature extracted for a particular promotion from a stored set of data may represent long term trends based on millions of impressions that have been collected over a period of years. Historical data trends tend to be at the promotion category or subcategory level of granularity. Typically, a historical feature value is updated infrequently (e.g., once every two years), since any new data being collected will need to accumulate before it is likely to affect the statistical distribution of the stored data. A model, such as the odds model, is further described with reference to U.S. patent application Ser. No. 13/411,502 entitled "Relevance System for Consumer Deals," filed on Mar. 2, 2012, and which is incorporated herein in its entirety.

In contrast, the DDO data are collected at the promotion level of granularity, and the data may represent dynamic shorter term trends that could affect the calculation of a promotion's contextual relevance score during a runtime workflow stage. For example, in embodiments, DDO data may reflect seasonal changes in consumer behavior (e.g., promotions for swimming lessons may be more in demand during summer, while promotions for goods may be more in demand during the Christmas season); global seasonal effects (e.g., the northern hemisphere has opposite seasons from the southern hemisphere); and/or cultural differences between consumers in different countries (e.g., French consumers tend to purchase more leisure activities than German consumers).

A predictive model based on combined features representing an integration of historical data and DDO data is a more accurate model, because it can generate its predictions based on long term trends and short term trends simultaneously. Such a model is a more general model that applies to a wider range of current data input, thus eliminating the need to either re-generate the model to capture short-term data fluctuations or to generate multiple models that each represent a particular type of trend (e.g., have a summer odds model and a winter odds model).

In some embodiments, a combined promotion performance feature value is a score that is calculated using a single data source in which historical performance data and DDO performance data have been integrated. This feature extraction method increases both efficiency and accuracy over alternative methods of calculating the combined performance score by combining separately calculated historical and DDO scores.

Figure 5:
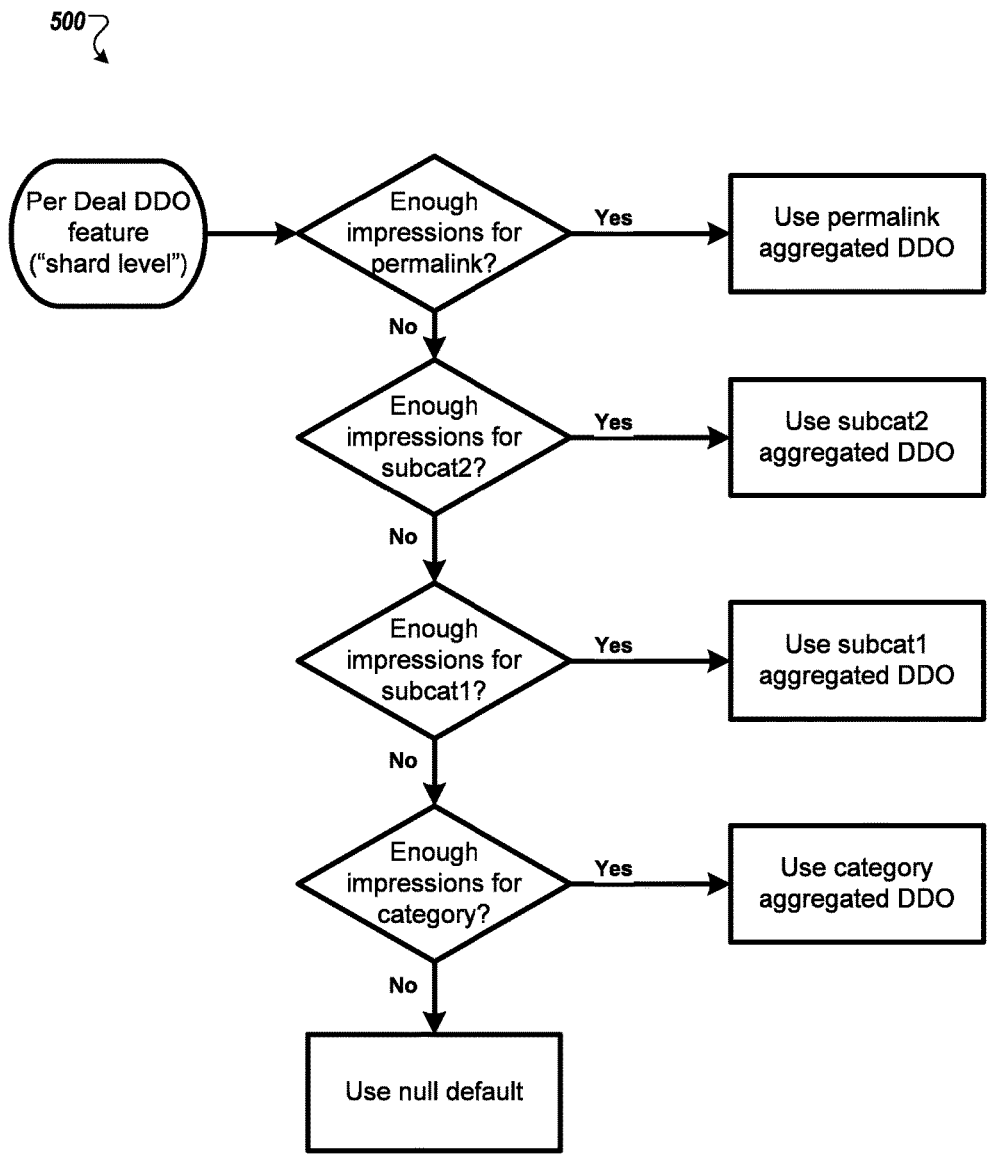
FIG. 5 illustrates a tiered logic flow for aggregating DDO data to use in a data source that integrates DDO and historical data in accordance with some embodiments discussed herein.

FIG. 5 illustrates a tiered logic flow 500 for aggregating DDO data to use in a data source that integrates DDO and historical data. Since DDO data are collected from impressions at the promotion level (i.e., impression data associated with a particular promotion permalink), there may not be enough collected impression data to integrate with the larger historical data sample. For example, in some embodiments, a DDO sample size of ≥1 million impressions is necessary to blend with historical data before calculating a feature value (e.g., a promotion performance score). Although popular and/or featured deals may enable data to be collected from the requisite number of impressions during the DDO sample window, mid-level deals are not likely to generate that many impressions. Thus, in embodiments, DDO data may be aggregated at increasing levels of granularity (i.e., tiered) to ensure that creating an integrated data source representing a particular promotion does not have to depend on data collected at the promotion permalink level.

In embodiments, the system receives extracted DDO feature data from a promotion. The system first determines whether there have been enough impressions to satisfy a previously determined threshold quantity (e.g., ≥1 million impressions) represented in that data to use the data at the promotion permalink level. If not, the system determines whether there have been enough impressions to satisfy the threshold quantity for the group of promotions in the promotion's next tier (i.e., second level subcategory (subcat2). The system proceeds to the next tier group to increase the number of promotions to consider until the largest tier group of promotions is evaluated (e.g., promotion category). If the number of impressions generated from the category does not satisfy the threshold quantity, the system does not integrate the DDO data (i.e., uses a null default).

For example, a combined promotion performance feature value for a massage promotion need not require DDO data related to a specific massage promotion, but instead may represent integrated historical and DDO performance data collected for spas promotions (the massage promotion subcategory) or for wellness promotions (the massage promotion category).

In an exemplary, embodiment a promotion and marketing system, performing the steps of FIG. 5, may define a taxonomy that comprises multiple categories, sub-categories and/or promotions. The categories may be categories associated with the subject matter of the products, services or experiences provided by the promotions. For example, a promotion for a discounted gold necklace may have an associated category of "Jewelry" and sub-categories of "Jewelry—Necklace" and "Jewelry—Gold."

In certain cases, an exemplary purchase category may indicate a subject matter or a functional classification of a commercial object, e.g., jewelry, pharmaceuticals, toiletries, cosmetics, home improvement, and the like. An exemplary sub-category may provide more granular indications of a subject matter or a functional classification of a commercial object, e.g., jewelry—men, pharmaceuticals—skin, home improvement—kitchen. Even more granular sub-categories may also be provided.

In certain cases, a category or sub-category may broadly indicate a classification of any feature of a commercial object. Exemplary categories or sub-categories may describe, for example, a subject matter associated with the commercial object (e.g., category "outdoorsy" may describe an outdoor equipment), a genre of a product (e.g., category "Italian food" or "sushi" may describe a type of food sold), a feature or component of a commercial object (e.g., category "spicy" may describe food that is spicy, categories "vegetarian," "fatty" and "gluten-free"), and the like.

In certain cases, a category or sub-category may indicate a contextual description describing a contextual feature or attribute of a commercial object. Exemplary contextual categories may describe, for example, a setting (e.g., category "romantic" may describe a restaurant as having a romantic setting), and the like.

In certain cases, a category or sub-category may indicate a quality associated with a commercial entity or object. Exemplary quality attribute descriptors may describe, for example, durability (e.g., category "rugged" may describe a durable pair of hiking boots), fragility (e.g., category "brittle"), and the like.

In some examples, the systems and methods described herein may operate using the taxonomy defined herein. For example, the system may determine whether there is enough DDO performance data to satisfy a threshold for a particular promotion. If not, the system will determine whether there is enough DDO performance data to satisfy a threshold for "Jewelry—Gold", if not, as described at least with respect to FIG. 5, the system will advantageously, in some examples, proceed to the next tier, in this case "Jewelry" to determine whether a threshold has been satisfied. In cases where the category "Jewelry" satisfies the threshold number of impressions, the system will assign or otherwise use the categories DDO performance data as a proxy for the sub category or promotions data that did not satisfy the threshold.

Figure 6:
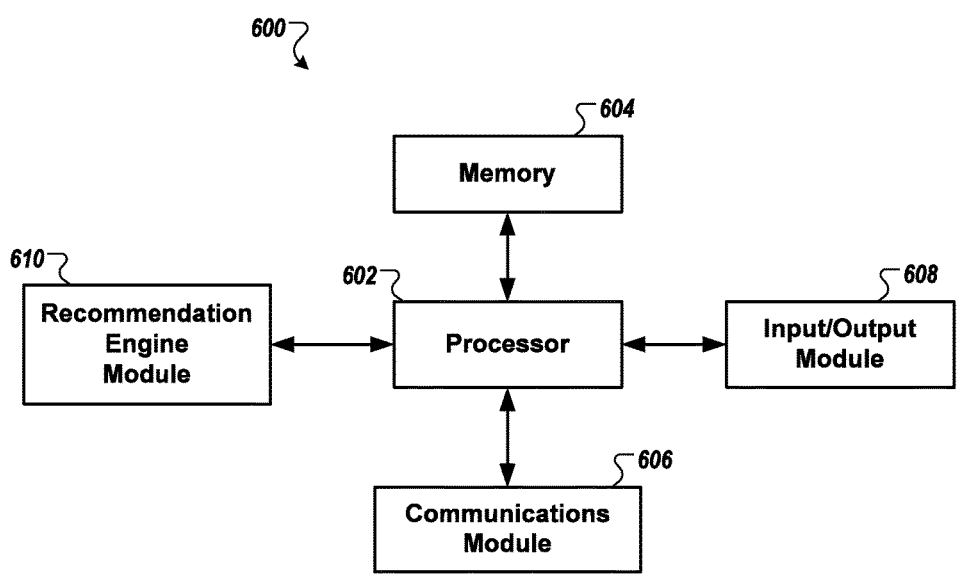
FIG. 6 illustrates a schematic block diagram of circuitry that can be included in a computing device, such as a recommendation engine, in accordance with some embodiments discussed herein.

FIG. 6 shows a schematic block diagram of circuitry 600, some or all of which may be included in, for example, recommendation engine 115. As illustrated in FIG. 6, in accordance with some example embodiments, circuitry 600 can include various means, such as processor 602, memory 604, communications module 606, and/or input/output module 608. As referred to herein, "module" includes hardware, software and/or firmware configured to perform one or more particular functions. In this regard, the means of circuitry 600 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 604) that is executable by a suitably configured processing device (e.g., processor 602), or some combination thereof.

Processor 602 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments, processor 602 comprises a plurality of processors. The plurality of processors may be embodied on a single computing device or may be distributed across a plurality of computing devices collectively configured to function as circuitry 600. The plurality of processors may be in operative communication with each other and may be collectively configured to perform one or more functionalities of circuitry 600 as described herein. In an example embodiment, processor 602 is configured to execute instructions stored in memory 604 or otherwise accessible to processor 602. These instructions, when executed by processor 602, may cause circuitry 600 to perform one or more of the functionalities of circuitry 600 as described herein.

Whether configured by hardware, firmware/software methods, or by a combination thereof, processor 602 may comprise an entity capable of performing operations according to embodiments of the present invention while configured accordingly. Thus, for example, when processor 602 is embodied as an ASIC, FPGA or the like, processor 602 may comprise specifically configured hardware for conducting one or more operations described herein. Alternatively, as another example, when processor 602 is embodied as an executor of instructions, such as may be stored in memory 604, the instructions may specifically configure processor 602 to perform one or more algorithms and operations described herein, such as those discussed in connection with FIG. 1.

Memory 604 may comprise, for example, volatile memory, non-volatile memory, or some combination thereof. Although illustrated in FIG. 6 as a single memory, memory 604 may comprise a plurality of memory components. The plurality of memory components may be embodied on a single computing device or distributed across a plurality of computing devices. In various embodiments, memory 604 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 604 may be configured to store information, data (including analytics data), applications, instructions, or the like for enabling circuitry 600 to carry out various functions in accordance with example embodiments of the present invention. For example, in at least some embodiments, memory 604 is configured to buffer input data for processing by processor 602. Additionally or alternatively, in at least some embodiments, memory 604 is configured to store program instructions for execution by processor 602. Memory 604 may store information in the form of static and/or dynamic information. This stored information may be stored and/or used by circuitry 600 during the course of performing its functionalities.

Communications module 606 may be embodied as any device or means embodied in circuitry, hardware, a computer program product comprising computer readable program instructions stored on a computer readable medium (e.g., memory 604) and executed by a processing device (e.g., processor 602), or a combination thereof that is configured to receive and/or transmit data from/to another device, such as, for example, a second circuitry 600 and/or the like. In some embodiments, communications module 606 (like other components discussed herein) can be at least partially embodied as or otherwise controlled by processor 602. In this regard, communications module 606 may be in communication with processor 602, such as via a bus. Communications module 606 may include, for example, an antenna, a transmitter, a receiver, a transceiver, network interface card and/or supporting hardware and/or firmware/software for enabling communications with another computing device. Communications module 606 may be configured to receive and/or transmit any data that may be stored by memory 604 using any protocol that may be used for communications between computing devices. Communications module 606 may additionally or alternatively be in communication with the memory 604, input/output module 608 and/or any other component of circuitry 600, such as via a bus.

Input/output module 608 may be in communication with processor 602 to receive an indication of a user input and/or to provide an audible, visual, mechanical, or other output to a user. Some example visual outputs that may be provided to a user by circuitry 600 are discussed in connection with FIG. 1. As such, input/output module 608 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 600 is embodied as a server or database, aspects of input/output module 608 may be reduced as compared to embodiments where circuitry 600 is implemented as an end-user machine or other type of device designed for complex user interactions. In some embodiments (like other components discussed herein), input/output module 608 may even be eliminated from circuitry 600. Alternatively, such as in embodiments wherein circuitry 600 is embodied as a server or database, at least some aspects of input/output module 608 may be embodied on an apparatus used by a user that is in communication with circuitry 600. Input/output module 608 may be in communication with the memory 604, communications module 606, and/or any other component (s), such as via a bus. Although more than one input/output module and/or other component can be included in circuitry 600, only one is shown in FIG. 6 to avoid overcomplicating the drawing (like the other components discussed herein).

Predictive recommendation engine module 610 may also or instead be included and configured to perform the functionality discussed herein related to the recommendation engine discussed above. In some embodiments, some or all of the functionality of predictive recommendation engine may be performed by processor 602. In this regard, the example processes and algorithms discussed herein can be performed by at least one processor 602 and/or predictive recommendation engine module 610. For example, non-transitory computer readable media can be configured to store firmware, one or more application programs, and/or other software, which include instructions and other computer-readable program code portions that can be executed to control each processor (e.g., processor 602 and/or predictive recommendation engine module 610) of the components of system 100 to implement various operations, including the examples shown above. As such, a series of computer-readable program code portions are embodied in one or more computer program products and can be used, with a computing device, server, and/or other programmable apparatus, to produce machine-implemented processes.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 602 and/or predictive recommendation engine module 610 discussed above with reference to FIG. 6, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 604) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for generating a combined feature representing a promotion, comprising:
receiving DDO feature data representing the promotion, wherein the DDO feature data include data collected from a first set of impressions associated with the promotion permalink;
determining, using a processor, whether the first set of impressions satisfies a threshold quantity of impressions; and
in an instance in which the first set of impressions does not satisfy the threshold quantity,
generating tiered DDO feature data representing the promotion, wherein the tiered DDO feature data were collected from a second set of impressions representing a tier group of promotions including the promotion;
receiving historical feature data representing the tier group of promotions;
integrating the tiered DDO feature data and the historical feature data;
generating the combined feature representing the promotion using the integrated tiered DDO feature data and the historical feature data;
selecting, based on the combined feature, a subset of promotions from a plurality of promotions, the subset of promotions to be recommended to a customer; and
transmitting the subset of promotions to a client device associated with the customer for display via the client device.

2. The method of claim 1, further comprising:
in an instance in which the first set of impressions satisfies the threshold quantity,
receiving historical feature data representing the promotion permalink;
integrating the received DDO feature data and the historical feature data; and
generating the combined feature representing the promotion using the integrated DDO feature data and the historical feature data.

3. The method of claim 2, further comprising:
in an instance in which the second set of impressions does not satisfy the threshold quantity,
generating another tiered DDO feature data representing the promotion, wherein the another tiered DDO feature data were collected from a third set of impressions representing another tier group of promotions including the promotion;
receiving historical feature data representing the another tier group of promotions;
integrating the another tiered DDO feature data and the historical feature data; and
generating the combined feature representing the promotion using the integrated another tiered DDO feature data and the historical feature data.

4. The method of claim 1, further comprising:
integrating historical behavior data collected from a sample of consumers and recently collected behavior data to generate DDO feature data.

5. The method of claim 1, further comprising:
generating historical feature data based on one or more detected historical trends.

6. An apparatus, operable on a distributed computing system, to generate a combined feature representing a promotion, the apparatus comprising:
a relevance engine, wherein the relevance engine is stored in a memory such that when executed by a processor the relevance engine is configured to receive one or more user requests and output one or more ranked available promotions in response to the user request, the ranked available promotions generated in part by at least a predictive model builder and a DDO feature data integrator;
wherein the predictive model builder is stored in the memory such that when executed by a processor the predictive model builder is configured to integrate DDO feature data, received via a network interface representing the promotion permalink and historical feature data representing the promotion permalink, wherein the DDO feature data include data collected from a first set of impressions associated with the promotion permalink; and wherein the DDO feature data integrator is stored in the memory such that when executed by a processor the DDO feature data integrator is configured to determine that the first set of impressions satisfies a threshold quantity of impressions and to generate a combined feature representing the promotion using the integrated DDO feature data and the historical feature data; and wherein the relevance engine is configured to select, based on the combined feature, a subset of promotions from a plurality of promotions, the subset of promotions to be recommended to a customer; and a communications module configured to transmit the subset of promotions to a client device associated with the customer for display via the client device.

7. The apparatus of claim 6, wherein the DDO feature data integrator is further configured to determine that the first set of impressions does not satisfy the threshold quantity of impressions and to generate a combined feature representing the promotion using integrated DDO feature data and the historical feature data.

8. The apparatus of claim 7 wherein the predictive model builder is further configured to generate tiered DDO feature data representing the promotion, wherein the tiered DDO feature data were collected from a second set of impressions representing a tier group of promotions including the promotion, access historical feature data representing the tier group of promotions, and integrate the tiered DDO feature data and the historical feature data.

9. The apparatus of claim 6 wherein the predictive model builder is further configured to integrate historical behavior data collected from a sample of consumers and recently collected behavior data to generate DDO feature data.

10. The apparatus of claim 6 wherein the predictive model builder is further configured to generate historical feature data based on one or more detected historical trends derived from one or more historical databases.

11. A computer-implemented method for generating a combined feature representing a promotion, comprising:
  receiving DDO feature data representing the promotion, wherein the DDO feature data include data collected from a first set of impressions associated with the promotion permalink integrating the DDO feature data and the historical feature data;
  generating a combined feature representing the promotion using the integrated DDO feature data and the historical feature data;
  selecting, based on the combined feature, a subset of promotions from a plurality of promotions, the subset of promotions to be recommended to a customer; and
  transmitting the subset of promotions to a client device associated with the customer for display via the client device.

12. A computer program product for generating one or more user selections for display as an impression via a promotion and marketing service, the computer program product comprising a non-transitory computer-readable storage medium storing computer-readable program instructions that, when executed, cause at least one computer to perform operations comprising:
  receiving DDO feature data representing the promotion, wherein the DDO feature data include data collected from a first set of impressions associated with the promotion permalink;
  determining, using a processor, whether the first set of impressions satisfies a threshold quantity of impressions; and
  in an instance in which the first set of impressions does not satisfy the threshold quantity,
  generating tiered DDO feature data representing the promotion, wherein the tiered DDO feature data were collected from a second set of impressions representing a tier group of promotions including the promotion;
  receiving historical feature data representing the tier group of promotions;
  integrating the tiered DDO feature data and the historical feature data;
  generating the combined feature representing the promotion using the integrated tiered DDO feature data and the historical feature data;
  selecting, based on the combined feature, a subset of promotions from a plurality of promotions, the subset of promotions to be recommended to a customer; and
  transmitting the subset of promotions to a client device associated with the customer for display via the client device.

13. The computer program product of claim 12, further comprising:
  in an instance in which the first set of impressions satisfies the threshold quantity,
  receiving historical feature data representing the promotion permalink;
  integrating the received DDO feature data and historical feature data; and
  generating the combined feature representing the promotion using the integrated DDO feature data and the historical feature data.

14. The computer program product of claim 13, further comprising:
  in an instance in which the second set of impressions does not satisfy the threshold quantity,
  generating another tiered DDO feature data representing the promotion, wherein the another tiered DDO feature data were collected from a third set of impressions representing another tier group of promotions including the promotion;
  receiving historical feature data representing the another tier group of promotions;
  integrating the another tiered DDO feature data and the historical feature data; and
  generating the combined feature representing the promotion using the integrated another tiered DDO feature data and the historical feature data.

15. The computer program product of claim 12, wherein selecting promotions to be recommended to a customer based on the combined feature comprises:
  receiving input data representing a request from a customer;
  receiving user data describing attributes of the customer;
  receiving, from a promotion inventory, promotion data describing attributes of a set of available promotions for the customer;
  calculating, based on at least one relevance model, a contextual relevance score for each of the set of promotions using the input data, the promotion data, and the user data; and ranking the set of available promotions based on their respective contextual relevance scores.

16. The computer program product of claim 12, further comprising:
   integrating historical behavior data collected from a sample of consumers and recently collected behavior data to generate DDO feature data.

17. The computer program product of claim 12, further comprising:
   generating historical feature data based on one or more detected historical trends.

\* \* \* \* \*